United States Patent [19]

Fitch et al.

[11] Patent Number: 5,056,060
[45] Date of Patent: * Oct. 8, 1991

[54] PRINTED CIRCUIT CARD WITH SELF-CONFIGURING MEMORY SYSTEM FOR NON-CONTENTIOUS ALLOCATION OF RESERVED MEMORY SPACE AMONG EXPANSION CARDS

[75] Inventors: Jonathan Fitch, Cupertino; Ronald Hochsprung, Saratoga, both of Calif.

[73] Assignee: Apple Computer, Inc., Cupertino, Calif.

[*] Notice: The portion of the term of this patent subsequent to Feb. 27, 2007 has been disclaimed.

[21] Appl. No.: 464,952

[22] Filed: Jan. 16, 1990

Related U.S. Application Data

[63] Continuation of Ser. No. 25,500, Mar. 13, 1987, Pat. No. 4,905,182.

[51] Int. Cl.$^5$ .................... G06F 13/14; G06F 13/36
[52] U.S. Cl. .................... 364/900; 364/935.4; 364/935.44; 364/964.4
[58] Field of Search ... 364/200 MS File, 900 MS File

[56] References Cited

U.S. PATENT DOCUMENTS

| | | | |
|---|---|---|---|
| 3,675,083 | 7/1972 | White | 317/101 |
| 3,710,324 | 1/1973 | Cohen | 364/200 |
| 3,993,981 | 11/1976 | Cassarino | 364/200 |
| 4,000,485 | 12/1976 | Barlow | 364/200 |
| 4,250,563 | 2/1981 | Struger | 364/900 |
| 4,368,514 | 1/1983 | Persaud | 364/200 |
| 4,375,665 | 3/1983 | Schmidt | 364/200 |
| 4,467,436 | 8/1984 | Chance | 364/513 |
| 4,633,402 | 12/1986 | Flimchbaugh | 364/421 |
| 4,811,275 | 3/1989 | Balogh, Jr. et al. | 364/900 |
| 4,821,182 | 4/1989 | Leininger | 364/900 |
| 4,837,677 | 6/1989 | Burrus, Jr. et al. | 364/200 |
| 4,905,182 | 2/1990 | Fitch et al. | 364/900 |

FOREIGN PATENT DOCUMENTS

| | | |
|---|---|---|
| 1380776 | 1/1975 | United Kingdom . |
| 2060961 | 5/1981 | United Kingdom . |
| 2101370 | 1/1983 | United Kingdom . |
| 2103397 | 2/1983 | United Kingdom . |

OTHER PUBLICATIONS

NUBUS-Asimple 32 Bit Backplane Bus P 1196 Specif. Draft 2.0 (I.E.E.E.), Dec. 15, 1986, This document is a draft specification of the P 1196 working group of the microprocessors standards committee of IEEE, pp. (11–60).

*Primary Examiner*—Stuart N. Hecker
*Assistant Examiner*—George C. Pappas
*Attorney, Agent, or Firm*—Blakely, Sokoloff, Taylor & Zafman

[57] ABSTRACT

A printed circuit board card adapted to fit into a slot and make electrical connections with cooperating terminals in the slot, the slot being disposed on the main circuit board of a personal computer system, the main circuit board including a CPU, memory, a 32-bit address bus with control signals associated therewith, and input/output circuity. The slot is coupled to the 32-bit address bus, being substantially a NUBUS bus, and the slot includes distinct identification line means which provide the slot with an identification number (distinct number) in the computer system. The card includes a decoder means which is coupled to the slot to receive the identification number; the decoder means has memory reservation means which causes 256 megabytes of memory space to be reserved for the card in the slot, such that, where the slot number is X, the 256 megabytes of reserved memory space begins at location $XOOO 0000 and ends at location $XFFF FFFF.

1 Claim, 7 Drawing Sheets

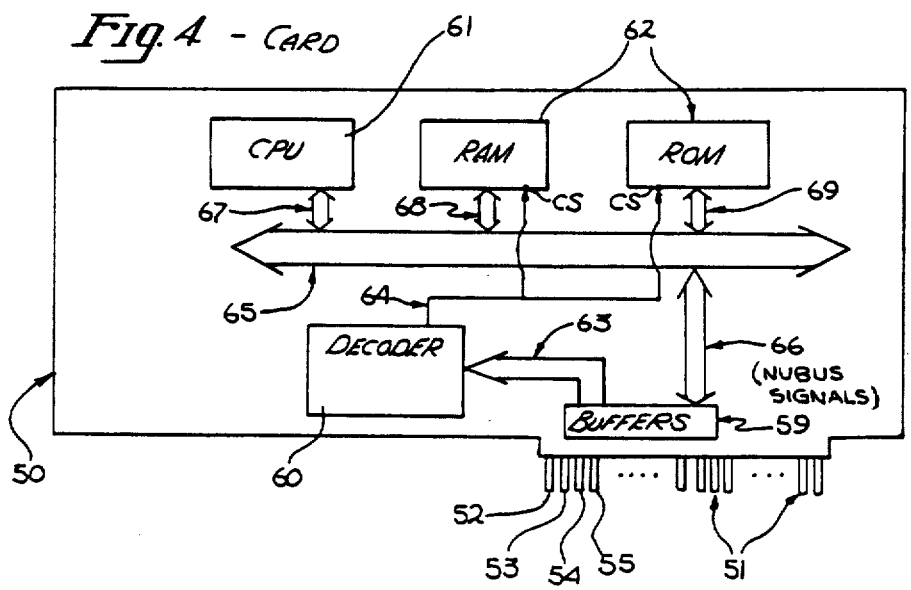
Fig. 4 - CARD
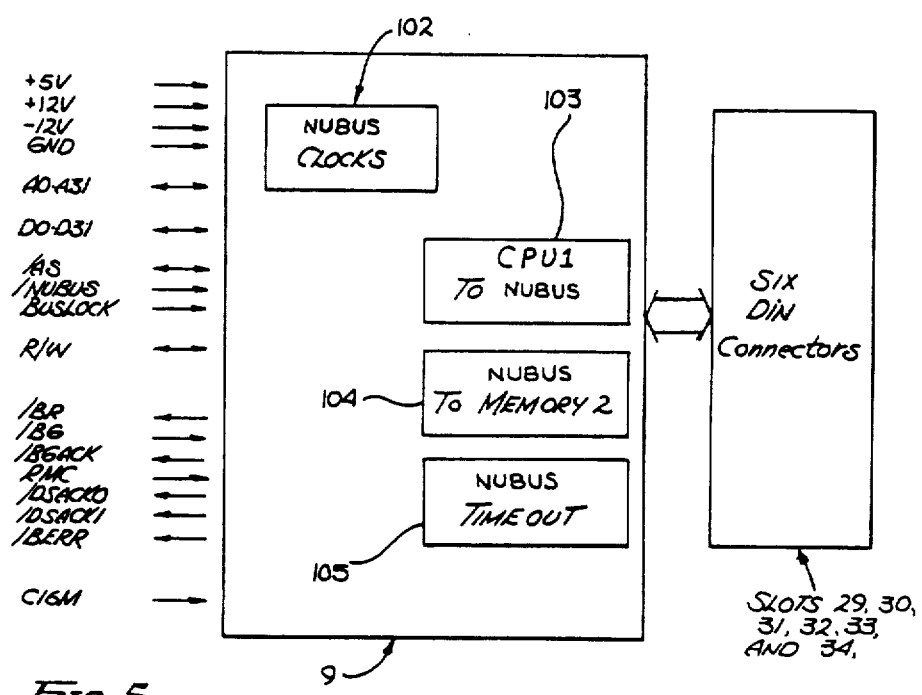
Fig. 5    NUBUS INTERFACE BLOCK DIAGRAM

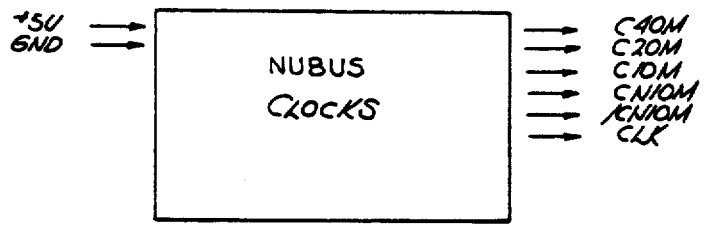
Fig. 6  NUBUS CLOCKS BLOCK DIAGRAM
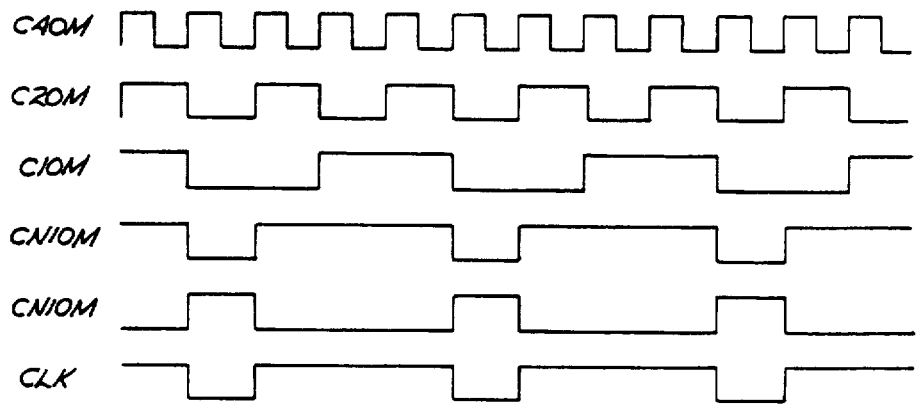
Fig. 7  PHASE RELATIONSHIP OF NUBUS CLOCKS
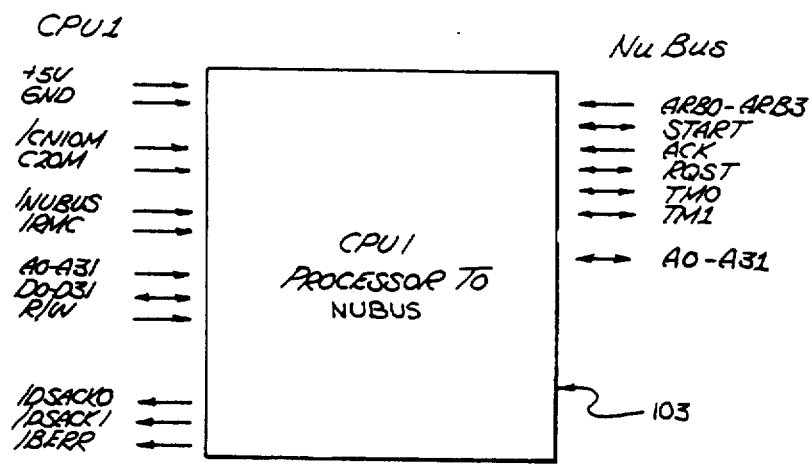
Fig. 8  PROCESSOR TO NUBUS BLOCK DIAGRAM

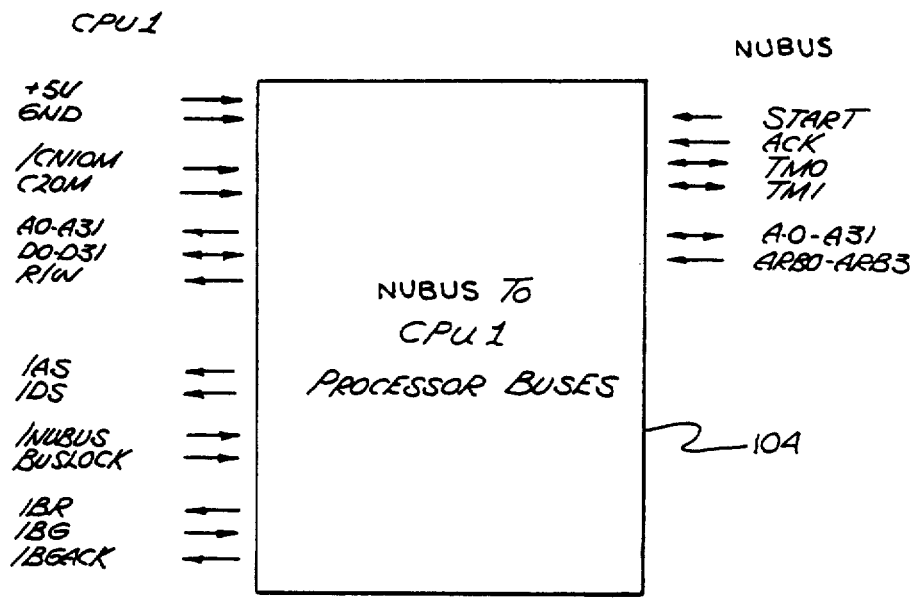
Fig. 9 NUBUS To Processor Bus Block Diagram
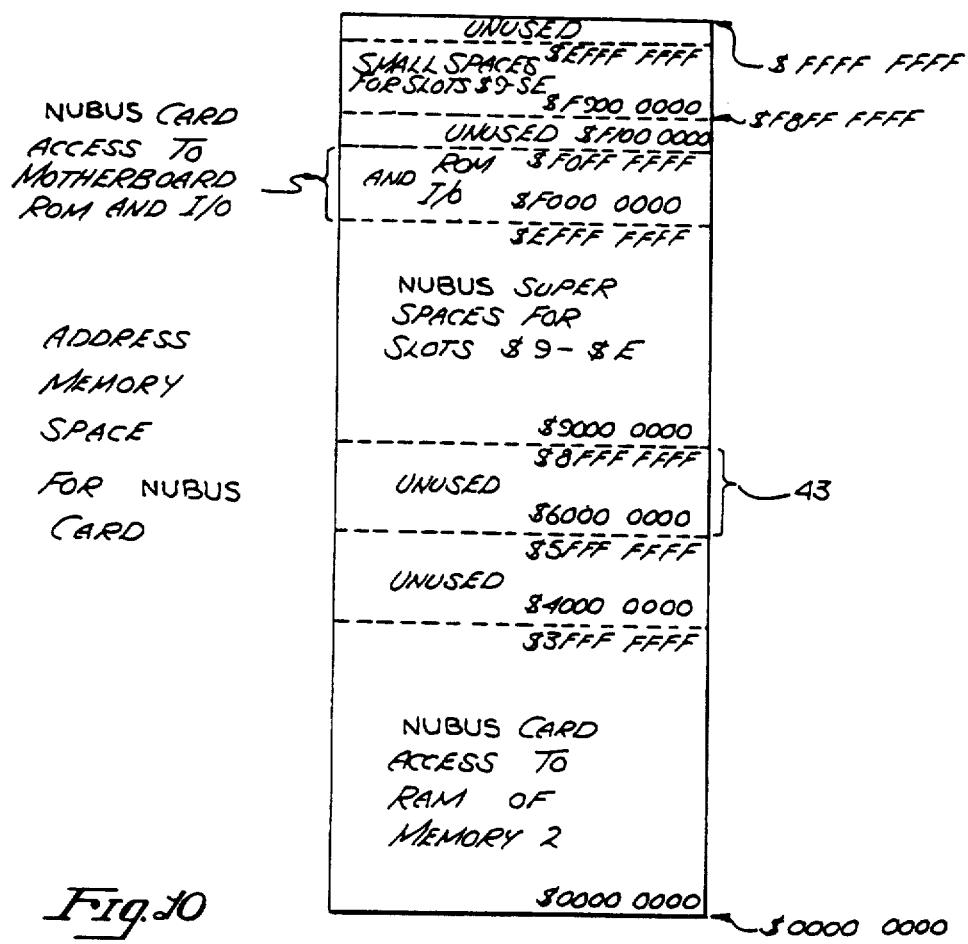
Fig. 10

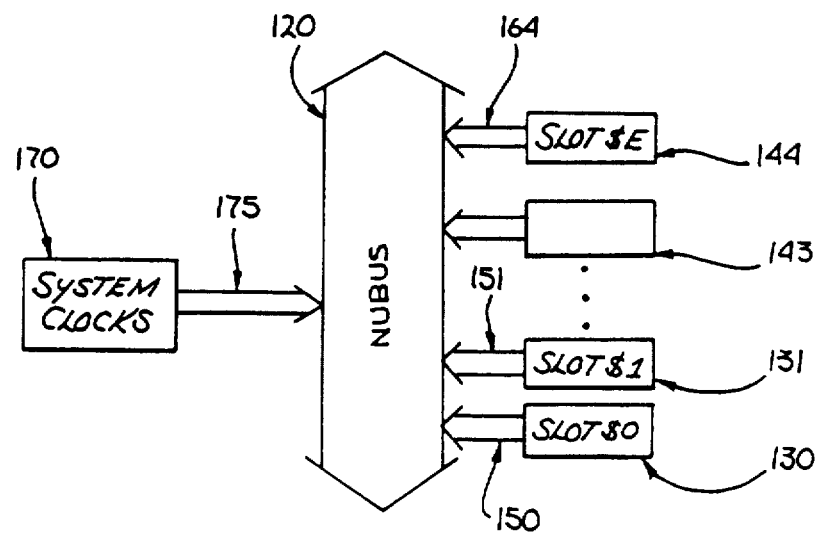
Fig. 13
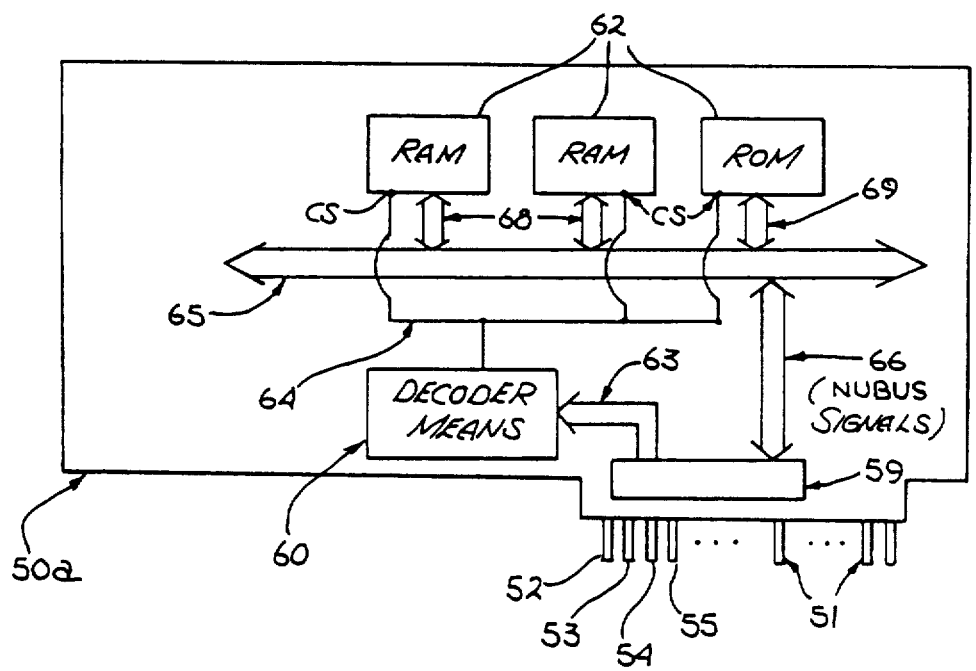
Fig. 14 - CARD

PRINTED CIRCUIT CARD WITH SELF-CONFIGURING MEMORY SYSTEM FOR NON-CONTENTIOUS ALLOCATION OF RESERVED MEMORY SPACE AMONG EXPANSION CARDS

This is a continuation of application Ser. No. 07/025,500 filed Mar. 13, 1987 now U.S. Pat. No. 4,905,182.

BACKGROUND OF THE INVENTION

1. Field of Invention

This invention relates generally to computer systems having expansion slots on a mother board (main circuit board) and more specifically, to personal computers including such slots and printed circuit board cards which are adapted to fit in such slots which are connected to a bus, where a portion of the address memory space in the computer is reserved for the slots.

2. Prior Art

Computer systems having expansion slots are well known in the prior art. For example, the Apple IIe is a well known personal computer having expansion slots; memory is reserved for the slots in that computer. However, the memory of a card in that computer is accessed not by first presenting the address but rather by selecting a particular pin in the slot (along with the address) which tells the card in the slot that the address which the microprocessor is calling for is somewhere in that peripheral card's reserved memory. Moreover, the reservation of memory space for cards in these systems is relatively small (e.g. 16-bytes or 256-bytes). That is, the address itself is usually not used alone to indicate when a card's address space is being addressed. Various references are available to one with ordinary skill in the art concerning the general nature of these computer systems. For example: *The Apple II Reference Manual*, Apple Computer (1981); *From Chips to Systems: An Introduction to Microprocessors*, Rodnay Zaks, Sybex, Inc., 1981; *An Introduction to Microcomputers*, by Adam Osborne and Associates, 1975; and *The Apple II Circuit Description*, Winston Gayler, published by Howard W. Sams & Co., Inc. (1983).

This invention relates more specifically to computer systems using systems buses which follow substantially NUBUS TM (a trademark of Texas Instruments) bus specifications, which specifications describe the protocols (e.g. logical, electrical and physical standards) and general standards of a sychronous (10 Mhz), multiplexed, multimaster bus which generally provides a fair arbitration mechanism. NUBUS bus originated at the Massachusette Institute of Technology. It has subsequently been revised and exists as published in certain publications of Texas Instruments, Inc. (including Texas Instruments publication number 2242825-0001 and Texas Instruments publication number 2537171-0001). Recently, a committee of the Institute of Electrical and Electronic Engineers (IEEE) has proposed specifications for a system bus, as an IEEE standard, that is substantially a NUBUS bus, although it has been modified from the specifications published by Texas Instruments. The proposed IEEE bus is referred to as the IEEE 1196 Bus. A copy of the proposed specification for the IEEE 1196 Bus (Draft 2.0) is provided with this application for whatever reference may be necessary by one of ordinary skill in the art. The IEEE 1196 Bus is substantially a NUBUS bus as originally specified in Texas Instruments' publications.

In a NUBUS bus system, there are 4-gigabytes of physical memory address space since there is a 32-bit address bus which may be coupled to a CPU capable of generating $2^{32}$ different addresses. In its simplest form, a computer utilizing the NUBUS bus architecture is essentially a main circuit board having slots into which one places cards (sometimes referred to as modules) having microprocessors, memory and other circuitry generally associated with microcomputers. In effect, each card may itself be a microcomputer which communicates through NUBUS bus to other cards in other slots which are also connected to NUBUS bus. Thus, for example, a NUBUS bus system may include a card having a CPU (central processing unit) microprocessor, a memory management unit, some memory in the form of random access memory (RAM) and read only memory (ROM), and a bus on the card which permits the microprocessor on the card to read the ROM on the card and to read from and write to the RAM on the card. In addition input and output (I/O) circuitry may be included on the card, which circuitry permits the card to communicate through terminals on the card with parts of the rest of the system, including peripheral units such as disk drives, printers, video systems and other peripheral units. The card typically has an edge which includes electrical terminals in the form of pins designed to make electrical connections with cooperating terminals in a slot. Such a card, having a microprocessor, would be capable of mastership of the NUBUS bus by executing certain signals to initiate a NUBUS bus transaction and thereby to transfer and receive information over the NUBUS bus on the main circuit board. Thus, that card could write information to memory located on other cards through NUBUS bus (a transaction) and read that information through NUBUS bus (another transaction).

In the NUBUS bus system, memory is reserved for each of the slots. In the NUBUS bus system, there can be up to 16 slots which are allocated memory space in the upper 1/16 of the entire 4-gigabyte NUBUS bus address space. That upper 16th is 256-megabytes of memory space, and it is divided into 16 regions of 16-megabytes which are mapped to the possible NUBUS bus card slots based on a slot identification number which produces a distinct number at each slot, allowing a card in the slot to "read" the distinct identification number to determine the slot number of the slot into which the card is plugged. See, generally, pages 30–32 of the proposed specification of the IEEE 1196 Bus. Thus, each card gets a "slot space" of 16-megabytes. In the conventional NUBUS bus system, a card's "slot space" is reserved by a device on the card which matches the distinct number (expressed in hexadecimal) of the slot (where the card is) to the second most significant hexadecimal digit (2nd MSHD) of an address appearing on the NUBUS bus, when the address's most significant hexadecimal digit (MSHD) is $F. Thus, the device determines when MSHD equals $F and then determines is the slot number (slot identification number) matches the 2nd MSHD; if there is a match, then the device permits the card to be addressed. Of course, the actual comparison by the card is done in binary, but for purposes of explanation, it is easier to consider the comparison as if it were done in hexadecimal.

This NUBUS bus system provides for considerable flexibility because the vast majority of the memory address space is unreserved. Moreover, the seemingly large (16-megabytes spaces reserved for the slots (the slot spaces) provide considerable data storage ("data" is used herein to include computer programs). However, too much flexibility fosters incongruities between cards which may be used on the same mother board. That is, this flexibility permits one to design a card which reserves most of the remaining address space in the NUBUS bus system which card would compete with another card developed to use a portion of the same memory space. Of course, switches and jumper cables may be utilized to configure the system to prevent over laps of memory space; however, such solutions are cumbersome in many ways, including their tendancy to frighten novices who would prefer a computer system that permits the user to simply plug the card into a slot and not worry any further.

The present invention solves these problems by allocating automatically 1/16th of the entire memory address space to each slot in the NUBUS bus system. Thus, it is an object of the invention to provide a system which configures itself and which is still flexible but which does not penalize the user because of its flexibility. It is a further object of the invention to provide main circuit board (mother board) having slots which allow greater automatic computer power due to increased memory space for each card. It is a further object of the invention to provide printed circuit board cards (modules) which automatically configure to their memory space and have increased memory space reserved for each of the cards.

SUMMARY OF THE INVENTION

This invention involves a computer system which has expansion slots coupled to a NUBUS bus, which slots have increased memory space available for and reserved for memory on cards (modules) in the expansion slots and where the reservation of the increased memory occurs by use of distinct identification line means which provides, via a distinct signal, a distinct number identifying the slot number to any card located in the slot. Moreover, the invention provides a card having a decoder means which is coupled to receive the distinct signal provided by the distinct identification line means. A decoder means compares the distinct number provided by the distinct signal to an address appearing on NUBUS. The comparison results in 256-megabytes of memory space being reserved for the card in a slot where the memory space ranges from $X000 0000 to $XFFF FFFF, where the slot number is X.

The decorder means compares the distinct number to the most significant hexadecimal digit of the address appearing on the NUBUS bus to determine whether the distinct number, in hexadecimal, is equal to the most significant hexadecimal digit in the address. When the decoder means determines they are equal, it enables any memory on the card to be addressed based on the address appearing on the NUBUS bus. The comparison, of course, is done in binary, but for purposes of explanation, it is easier to consider the comparison process as if it were done in hexadecimal.

BRIEF DESCRIPTION OF THE DRAWINGS

FIG. 4 shows a printed circuit board card of the invention which is intended for use with the mother board of the invention.

FIG. 5 is a block diagram showing the NUBUS bus interface with a microprocessor on the main circuit board.

FIG. 6 is a block diagram showing the various NUBUS bus clocks designed for use with the NUBUS bus.

FIG. 7 shows the phase relationship of the various NUBUS bus clocks.

FIG. 8 is a block diagram of the interface between the mother board processor (CPU 1) and NUBUS bus in NUBUS bus slots.

FIG. 9 is a block diagram showing the NUBUS bus to mother board processor bus interface.

FIG. 10 shows an address memory space allocation as seen by a card in a NUBUS bus slot where the card accessess the ROM portion of memory 2 by addressing the upper portion of the small space for slot 0.

FIG. 11 is a perspective view of the main circuit board (mother board) of a computer system according to the invention.

FIG. 13 is a block diagram of a computer system according to the invention.

FIG. 14 shows a printed circuit board card of the invention which is intended for use with the main circuit board of the invention.

DETAILED DESCRIPTION OF THE INVENTION

In the following description, numerous specific details are described and shown, such as circuits, block diagrams, memory locations, logic values, etc. in order to provide a thorough understanding of the present invention. However, it will be obvious to one skilled in the art that the present invention may be practiced without these specific details. In other instance, well known components and sub-systems are not described in detail, in order not to unnecessarily obscure the present invention.

Figure 1:
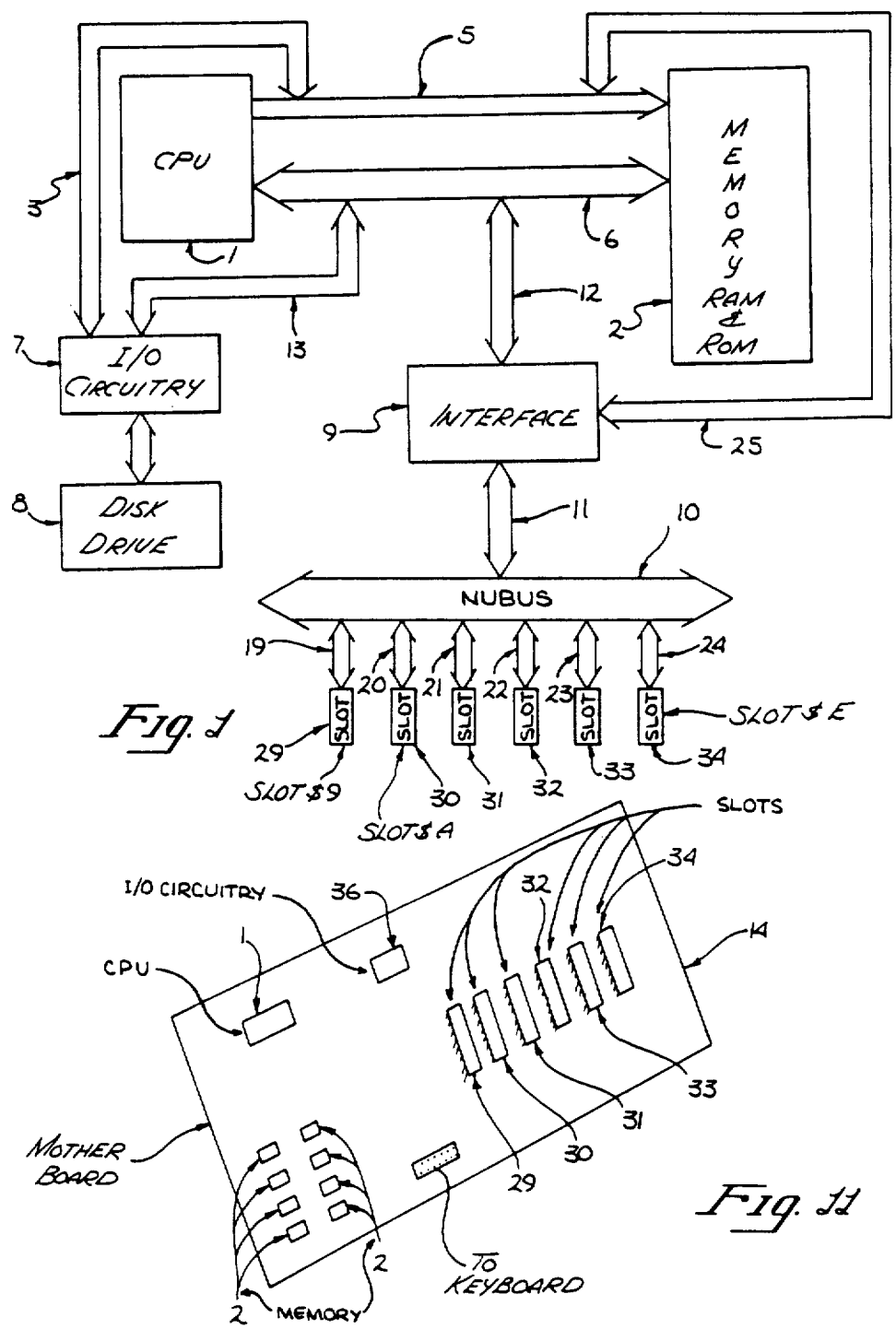
FIG. 1 is a block diagram of a general computer system of a preferred embodiment of the invention where there are 6 slots coupled to the NUBUS bus 10.

FIG. 1 shows the general structure of a computer system according to the present invention. The system includes a central processing unit 1 (CPU 1), which is usually a microprocessor, and which is coupled to memory 2 to permit the CPU 1 to read data from the memory 2 and write data into the memory 2. The CPU 1 is coupled to the memory 2 to provide addressess of memory locations via the processor bus 5, which acts as an address bus and provides addresses to the memory 2 from the CPU 1. Data (which includes computer program instructions) from the addressed memory locations is provided by the memory 2 into the processor bus 6 which acts as a bidirectional data bus. The CPU 1 may write to the memory 2 by first providing an address over the processor bus 5 which addresses memory locations in the memory 2 according to the address signals over the processor bus 5 and then writing to the memory 2 by providing data over the processor bus 6 to the memory 2. As is well-known, certain signals from the CPU 1, which may be carried over the processor bus 5, indicate whether the CPU 1 is writing to the memory 2 or reading from the memory 2. The processor bus 5 is a 32-bit address bus and thus includes 32 address lines which provide the address signals. The processor bus 5 further includes control signals (e.g. R/W (read/write) and Chip Select) which indicate whether the CPU 1 is reading (from the memory) or writing (to the memory) and other associated control signals, including control signals for the particular microprocessor being used and timing signals (e.g. column address strobes and row address strobes) as is well-known in the prior art and therefore is not discussed herein in greater detail. The processor bus 6 includes a 32-bit data bus (and thus 32 data lines which provide the data signals) and associated control signals for the particular microprocessor being used which are typically included with data buses, as is well-known in the prior art (e.g. write enable signal, etc.). The CPU 1 according to the invention includes an address generation means for generating $2^{32}$ different addresses ranging from location $0000 0000 to location $FFFF FFFF (the dollar sign indicates hexadecimal notation); that address generation means is typically coupled to the processor bus 5 and is part of the CPU 1, such as the microprocessors 68020 (Motorola) and 80386 (Intel).

The computer system also includes input and output circuitry which, as is well known in the prior art, is used to interface the computer to receive data from and provide data to peripheral units. The details of this circuitry are well known. Input/output (I/O) circuitry 7 is coupled to the CPU 1 and the memory 2 via the interconnect bus 13 and the processor bus 6 and the processor bus 3. The I/O circuitry 7 may be utilized to provide access to peripheral devices, such as disk drives, printers, modems, video displays and other peripheral units for use with the computer system. As shown in FIG. 1, a disk drive 8 is coupled to the I/O circuitry by an interconnect bus shown between the I/O circuitry 7 and the disk drive 8. The I/O circuitry 7 is coupled to the memory 2 through the processor bus 6 to provide data to the memory and to receive data from the memory and from the CPU 1; the bus 3 allows the CPU to address the peripheral units attached to the I/O circuitry 7 and allows the I/O circuitry 7 to address the memory 2. The I/O circuitry 7 is also coupled to the CPU to receive data and control signals from the CPU 1. Thus, the peripheral units, such as the disk drive 8, can exhange data (which includes programs) with the CPU 1 and the memory 2; it can also exchange data with any cards and the slots coupled to the NUBUS bus 10 such as slot 29 which has a distinct number, $9, in the computer system shown in FIG. 1.

In a typical transaction the CPU 1 provides an address over the bus 5. The memory 2, which is coupled to the bus 5, receives the addresses and provides a value over bus 6 based on the location addressed according to the address provided on the bus 5. The data from memory 2 is provided over the processor bus 6 to the CPU 1. Memory 2 typically includes RAM and may further include ROM (read only memory). The processor bus 6 is coupled to the NUBUS bus 10 through the interface 9 and interconnect buses 11 and 12.

The computer system shown in FIG. 1 includes six "expansion" slots which are designed to receive printed circuit board cards and to make electrical connections with circuitry on the cards, such as cards 50 and 50a in FIGS. 4 and 14 respectively. That system includes slots 29, 30, 31, 32, 33 and 34 which are each coupled to another system bus, NUBUS bus 10, on the mother board. Thus, slot 29 is coupled to NUBUS bus 10 via the interconnect bus 19. Each of the slots includes cooperating terminals, each of which is electrically coupled to a particular signal line of the NUBUS bus 10 through the interconnect buses; thus, each of the slots 29, 30, 31, 32, 33 and 34 includes a set of cooperating terminals which provide electrical connections to the NUBUS bus 10. A card according to the present invention includes terminals 51 which are designed to make electrical connections with the respective cooperating terminals in the slot, to thereby permit components on the card to receive all of the signals of the NUBUS bus 10.

A card in one of the slots 29, 30, 31, 32, 33 or 34 can communicate with the memory 2 via the NUBUS bus interface 9, and the CPU 1 can communicate with any memory on the card via NUBUS bus interface 9, which is described below. For example, NUBUS bus interface 9 receives addresses for memory on a card in a slot from the CPU 1 over the bus 25 and provides those addresses onto the NUBUS bus 10 through interconnect bus 11; the interface 9 serves to allocate and synchronize the processor buses 5 (through 25) and between the CPU 1 and any CPU on a card (which may seek to control the NUBUS bus to read from or write to the memory on a card). Similarly, the interface 9 receives addresses for the memory 2 from a CPU on a card ("NUBUS bus device") through NUBUS bus 10 and the interconnect bus 11; following synchronization to the processor buses and determination that the NUBUS bus device (which generated the address) may take control of the processor buses (by placing address signals onto the processor address bus 5 through bus 25), the interface 9 provides the address signals to the bus 25 which is connected to the memory 2. The memory 2 responds with data from the addressed location, which data is placed onto the bus 6 which is coupled to the interface 9 which provides that data to the NUBUS bus device through the NUBUS bus 10.

The computer system shown in FIG. 1 utilizes the NUBUS bus as an expansion bus for a computer system on a main circuit board where the CPU 1 processor buses on the main circuit board may not be NUBUS buses. Thus, the slots coupled to the NUBUS bus 10 provide the capability to expand the system to include, for example, additional memory of an additional processor card. However, it is possible to utilize the invention with a NUBUS bus architecture where there is no CPU on a main circuit board and no memory on that board. Such a system is shown in FIG. 13 and will be described below.

FIG. 13 shows a general example of the invention for a computer system utilizing a NUBUS bus 120 on a main circuit board which includes slots each of which is coupled to the NUBUS bus 120. The main circuit board of such a system, as illustrated in FIG. 13, may include the NUBUS bus 120 and 15 slots designated as slot 130, slot 131, . . . through slot 144. Each of the slots is coupled to the NUBUS bus 120 by in interconnect bus; hence, slot 130 is coupled to the NUBUS bus 120 by interconnect bus 150, which interconnect bus normally includes all lines of the NUBUS bus 120 and, in addition, includes four lines which serve as distinct identification line means. These four lines typically carry binary values which together can specify any number from 0 to 15. Each of the slots receives a distinct identification line means which provides a different (distinct) number to each of the slots. That is, a distinct identification line means incorporated as part of the interconnect bus 150 carries a distinct signal equal to 0. Slot 144 (slot $E) has a distinct identification line means incorporated as part of the interconnect bus 164 which provides a value (a distinct signal) equal to $E. It is noted that there is no 16th slot because the NUBUS bus standard uses the upper most 256-megabytes (shown as region 40 in FIG. 2) for the small slot spaces (16-megabytes each) allocated to slots 0 through 15. This is seen more clearly in FIG. 2 which illustrates the physical address memory space of a system such as that shown in FIG. 13. Each of the slots $0 through $E have a "super space" of 256-megabytes. Thus, for example slot 0 has a super space of 256-megabytes which was reserved for it from memory location $0000 0000 to $0FFF FFFF. This space is shown generally by number 41 on FIG. 2. This system shown in FIGS. 13 and 2 includes a slot $0 with money space reserved for that slot; however, because many microprocessors favor memory in region 41 (the slot $0 super space), for the sake of convenience a typical application of the general invention (e.g. FIG. 13) may not include a slot $0 and no reservation of memory space 41 will be made for any particular slot. Thus, any cards in the remaining slots (i.e. slots $1 to $E) may use the memory in region 41. Of course, any number of slots less than 15 may be inplemented according to the invention. As required by the NUBUS bus standards, each of the slots $0 through $E have reserved for them 16-megabytes of space located in the 256-megabyte region labelled generally 40; this region spans from location $F000 0000 to location $FFFF FFFF. Identification signals, such as the four distinct identification lines are used to allocate the "small spaces" in the region 40 to each of the cards. Each of the small spaces in the region 40 is also referred to in the NUBUS bus standards as the "slot space". Addresses of the form $FSiXX XXXX reference address space which belongs to.the slot space of the card in slot Si. See pages 30-31 of the IEEE 1196 Specification, Draft 2.0 which is submitted with this disclosure.

Figure 2:
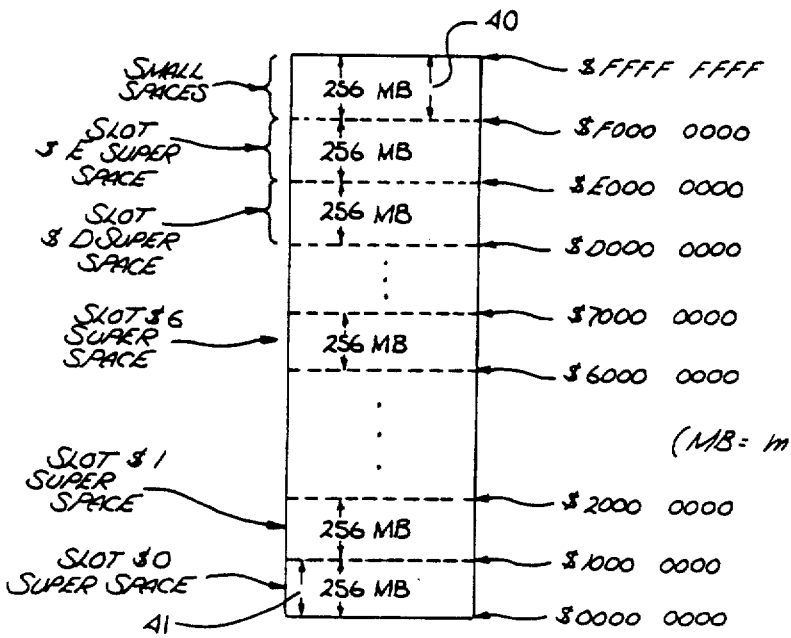
FIG. 2 is a map of the physical address memory space of an embodiment of the invention.

FIG. 2 illustrates the general physical address memory space of the system illustrated generally in FIG. 13. The main circuit board which includes NUBUS bus 120 does not include a CPU or memory. The system clocks 170 on the main circuit board provide the NUBUS bus clock signals and are coupled to the NUBUS bus 120 via lines 175 as shown in FIG. 13. Not shown, but understood is the power supply circuitry for the NUBUS bus signals. It is also understood that the main circuit board of the system shown in FIG. 13 should include other NUBUS bus services which are not placed on the cards, such as the NUBUS bus timeout circuitry.

The computer system shown in FIG. 13 would typically include two printed circuit board cards one of which would be inserted into one slot and the other card (a second card) being inserted into another slot. For purposes of illustration, assume the first card is plugged into the slot $0 (i.e. slot 130) and the second card is plugged into slot $1 (i.e. slot 131). The cards are generally illustrated in FIGS. 4 and 14. They include a printed circuit board card 50 or 50a and terminals 51, which terminals are coupled to various components and signal lines on the card 50 or the card 50a. The terminals 51 are on a portion of a printed circuit board which protrudes into a receptacle in the slots which contain cooperating terminals for making electrical connections with respective terminals on the card. The physical standards of the interconnections are specified by the NUBUS bus standard. The cooperating terminals in the slots are coupled to the various lines and components on the main circuit board; for example, many of the cooperating terminals in the slots are electrically coupled to the NUBUS bus signal lines. These cooperating terminals permit the components on the card to receive the various signals present on the NUBUS bus 120 and to permit one card in one slot to communicate with another card in another slot through NUBUS bus 120 via the interconnect buses, such as interconnect 150 and 151.

In the present example involving FIG. 13, the first card 50 (assumed to be in slot $0) includes a CPU, such as CPU 61 shown in FIG. 4, and a memory, such as RAM 62 and ROM 62 which are coupled together through a card bus 65 disposed on the first card 50. The CPU 61 and the memory 62 are coupled to the system bus, which is the NUBUS bus 120, through the terminals 51 on the card 50. The second card 50a (see FIG. 14) in slot $1 includes a memory 62 shown in FIG. 14, such as a random access memory, but does not include a CPU. Such a card is referred to as a slave card and cannot take mastership of the bus 120. The second card typically includes a card bus 65 which includes most (if not all) of the same signals found on NUBUS bus 120. Certain of the address (and data) lines of the NUBUS bus 120 (which are referred to as AD (31 . . . 0) in the IEEE 1196 specification, Draft 2.0 since the addresses and data are multiplexed over the same lines) are applied to the decoder means 60. The bus 66 shown in FIG. 4 usually carries the complete NUBUS bus address and data signals and control signals and power signals. In this disclosure, the 32 address lines of NUBUS bus (which also serve as the 32 data lines on NUBUS bus) are referred to as A31 through A0 even through they are the NUBUS bus signals AD (31 . . . 0). Essentially, the decoder means 60 of card 50a permits the memory 62 on the second card 50a to be addressed when the addresses on the NUBUS bus 120 are in the reserved address space of the second card, which in this instance is addresses from location $1000 0000 through location $1FFF FFFF. When the addresses are in that reserved memory space, the decoder means 60 activates the Chip Select (CS) lines (which are coupled to the line 64 from the decoder means 60) of the memory 62 on the card 50a thereby indicating to the various RAM and ROM chips on that card that they are being addressed, thereby addressing the memory 62 on the card 50a in slot $1. Thus, the memory on the second card 50a will receive addresses from the system bus when the decoder means enables, by the Chip Select pins, the memory chips.

Thus, the CPU on the first card 50 in slot $0, which CPU has an address generation means for generating $2^{32}$ different addresses for addressing memory, provides an address through the terminals of the card in slot $0 onto NUBUS bus 120. Portions of that address appear in the decoder means 60 on the second card 50a. If that address is in the range $1000 0000 to $1FFF FFFF the memory on the second card will respond providing data onto NUBUS bus 120 during the appropriate timing cycle.

The decoder means 60 on the second card in slot $1 of FIG. 13 compares the distinct number of slot $1, which number is $1, to the most significant hexadecimal digit of the address appearing on the system bus (NUBUS bus 120) to determine when the distinct number, in hexadecimal, is equal to the most significant hexadecimal digit of the address. When that occurs, the decoder means enables the second memory to be addressed to provide data onto the system bus. Thus, the 256-megabyte "super space" is reversed for the second card in slot $1. As explained below, the decoder means also performs the function of reserving the 16-megabytes of memory space called for in the specifications of NUBUS bus systems.

It will be appreciated that slot $1 of FIG. 13 is coupled to a distinct identification line means which provides a distinct signal to the slot, which signal identifies a distinct number of that slot. This is true for each of the other slots in FIG. 13 (e.g. slot 144 has a distinct signal of $E which is the distinct number of that slot). Typically, a distinct identification line means comprises four conductors carrying binary values. For slot $1, only one of the four lines will carry the binary value 1 while all others will carry the binary value O, where the 1 is in the least significant binary digit. Thus, the distinct identification line means will provide the distinct signal 1 to the slot $1 which will identify that slot as having a distinct number $1. It is understood that other ways of identifying a distinct number may be accomplished, such as providing an identification number which through arithmetic conversions produces the distinct number of the slot. Alternatively, one conductor having multilevel logic may be provided as the distinct identification line means.

A preferred embodiment of the invention utilizing six (6) slots will now be described with reference generally to FIGS. 1, 3, 11 and 12. FIG. 11 shows a perspective view of a main circuit board 14 (also referred to as a mother board) which includes a CPU 1, memory 2 which includes read only memory (ROM), I/O circuitry 36, and six slots numbered 29 through 34. The mother board 14 also includes a connector means for providing a connection to a key board as shown in FIG. 11. As with any other personal computer system, the mother board 14 also includes various other circuitry, such as power supplies, latches and buffers, drivers and may include video circuitry, clock circuitry and other components typically associated with personal computer systems as is well known in the prior art. Each of the slots 29, 30, 31, 32, 33, and 34 include cooperating terminals which make electrical connections with terminals 51 on a card which is inserted into the slot. Each of the slots 29-34 receive, according to NUBUS bus standards, substantially all the NUBUS bus signals in NUBUS bus 10 as shown in FIG. 1. The slots receive the NUBUS bus signals through interconnecting buses 19, 20, 21, 22, 23, and 24 as shown in FIG. 1. These connections are common (identical) to each of the slots except for the distinct identification line means which identifies to each of the slots a distinct number that each slot has.

In this particular embodiment, slot 29 is assigned a distinct number $9 by four conductors (lines) carrying binary values as illustrated in the table below. These four conductors are part of the interconnecting bus 19 although they need not be physically present throughout the entire length of the lines in the NUBUS bus 10 because they can be locally provided in the immediate proximity of slot $9. This is similarly true for slots 30, 31, 32, 33 and 34. The Geographic Address shown in Table 1 is, of course, the distinct number of each of the slots.

TABLE 1

NUBUS bus Slot Numbers For FIG. 1 System

| Slot Number in Fig. 1 | Geographic Address | GA3 | GA2 | GA1 | GA0 | Binary Value |
|---|---|---|---|---|---|---|
| 29 | $9 | GND | open | open | GND | 1001 |
| 30 | $A | GND | open | GND | open | 1010 |
| 31 | $B | GND | open | GND | GND | 1011 |
| 32 | $C | GND | GND | open | open | 1100 |
| 33 | $D | GND | GND | open | GND | 1101 |
| 34 | $E | GND | GND | GND | open | 1110 |

(Binary Values shown after logical inversion by an inverter of the NUBUS bus signals)

Each of the lines in the distinct identification line means for each of the slots is coupled to circuitry which attempts to pull up the lines to the power supply signal +5 V. This circuitry will usually involve a pull up resistor, according to NUBUS bus standards, on each of the distinct identification lines, which resistor will pull up the open signals to substantially +5 V and the ground signals will remain substantially at ground. The circuitry shown in FIG. 12, which will be discussed below, assumes that the open signals have already been pulled up (prior to applying them to the decoder means 60) substantially to the power supply voltage level of +5 V and that the NUBUS bus signals (including the GA3 ... GA0 signals and address (A31 ... A0) signals) have been logically inverted by an inverter. Furthermore, each of the NUBUS bus signals on NUBUS bus 10 must be inverted logically (through an inverter on the cards) before application to the circuitry on the NUBUS bus cards (e.g. card 50 and card 50a); similarly, signals from the cards onto NUBUS bus 10 must be inverted logically (through an inverter). Typically, these inverters would be included on the input and output buffers used on the cards. At the interface 9. which interfaces between the NUBUS bus 10 and the motherboard circuitry (i.e. CPU 1, Memory 2, I/O Circuitry 7, the various buses 5, 6, 25, etc.), signals going onto the NUBUS bus 10 are inverted and signals coming from NUBUS bus 10 are inverted. Thus, for example, the GA3 NUBUS bus signal (GND) which is applied to the slots is inverted to logical one ("1") on the card and is then applied to the circuitry in the decoder means 60 shown in FIG. 12. These inversions are well known in art. Of course, if the CPU 1 and its associated circuitry and buses (e.g. buses 5, 6, 25.) utilize the NUBUS bus system, standards and signals, then no inversion at the interface 9 is necessary.

It can be seen that in this embodiment (shown in FIGS. 1, 11 and 3), slot 30 will have the distinct number $A; slot 31 will have the distinct number $B; slot 32 will have the distinct number $C in the computer system; the distinct number for slot 33 will be $D, and slot 34 will have the distinct number $E. In the IEEE's proposed specification for the NUBUS bus, referred to as the IEEE 1196 bus specification the distinct identification line means are referred to as the card slot identification and are represented by the symbol "ID (3 ... 0)" which represent the geographical addresses GA3, GA2, GA1, and GA0. As noted in that specification of the IEEE, at page 6, these four lines are not bussed but are binary encoded at each position to specify the card's position in the computer.

Figure 3:
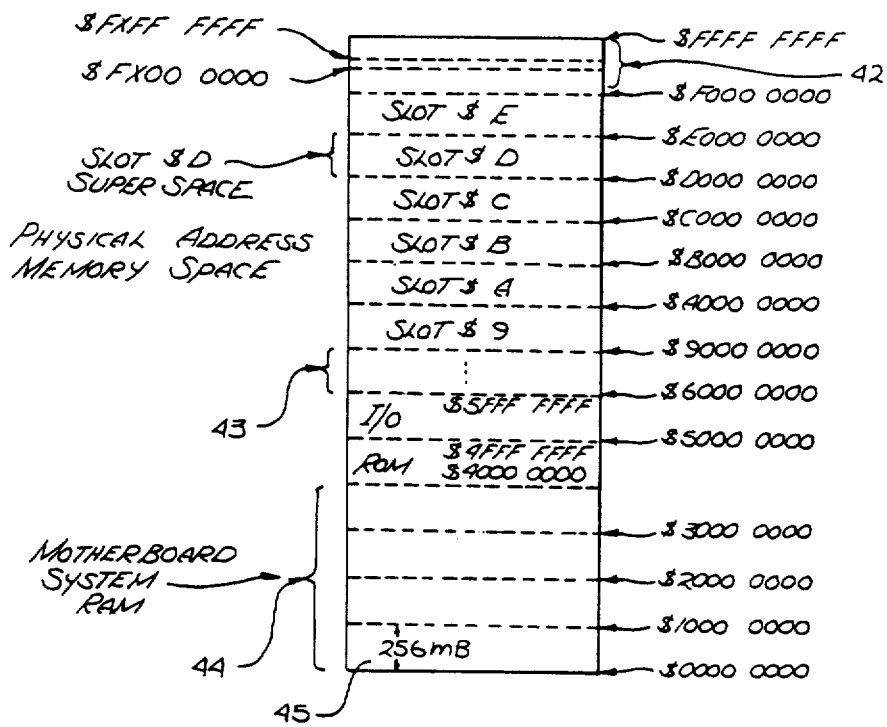
FIG. 3 is a physical address memory space map showing the memory space allocation for a preferred embodiment of the invention.

According to the present invention, a computer system as generally shown in FIG. 1 results in a physical address memory space as shown in FIG. 3 where each of the six slots has a "super space" containing 256-megabytes of reserved memory space. Thus, for example, slot $9 has a reserved super space beginning at location $9000 0000 and ending at location $9FFF FFFF. In addition, slot $9 may also have a small space ("slot space") reserved according to the NUBUS bus specification; in accordance with those specifications, slot $9 will have a small space reserved for it beginning at location $F900 0000 to location $F9FF FFFF. As shown in FIG. 3, the 256-megabyte region 42 contains the small spaces for the various slots. There is an unreserved NUBUS bus memory address space 43 which may be used by additional expansion slots which may be added to a system designed according to the present invention. The lowest 256-megabyte memory space, designated 45, is the local address space for the CPU 1 which is assigned the distinct number $0 as if it were on a card in slot $0. The CPU 1 may be designed to "occupy" additional slots—that is it may be assigned distinct numbers $1, 2 and 3 and therefore have the entire region 44 reserved as in the particular embodiment shown in FIG. 3; in effect, the motherboard becomes a card in 4 slots ($0, 1, 2, and 3). If the designer seeks to isolate super space slot $0 completely for CPU 1's use (i.e. prevent a NUBUS bus access to that super space $0), the NUBUS bus interface 9 will be designed to prevent such access but permit access to the data in super space $0 by aliases replicated in super space $1 or $2 or $3. Thus, NUBUS bus addresses on NUBUS bus 10 in super space $0 may be decoded to the same respective location (i.e. $0XXX XXXX to $1XXX XXXX) in super space $1. In such a situation the NUBUS bus cards (in the actual physical slots $9 through $E) may access the slot $0 super space by addressing super spaces $1, 2 or 3 which can be designed to include aliases of the data stored in super space $0. The address space ($0000 0000 to $1000 0000) is also the local address memory space for cards operating entirely on the card without a NUBUS bus transaction; that is, a card, such as the one shown in FIG. 4 having a CPU may locally address its local RAM on the card in this same address space 45 provided the CPU does not initiate a NUBUS bus transaction. Such an arrangement for purely local transactions on the card is implemented by address decoders on the card as is well known in the art.

This particular embodiment shown generally in FIG. 1 also reserves additional memory space for the I/O circuitry and read only memory (ROM) which is part of the Memory 2 as shown in FIG. 3. In particular, address memory space is reserved from $4000 0000 to location $4FFF FFFF. Moreover, memory address space for I/O operations and circuitry is reserved from location $5000 0000 to location $5FFF FFFF. FIG. 3 shows an embodiment of the present invention where the I/O and ROM memory space is located at $4000 0000 to $5FFF FFFF. Thus, access to ROM or I/O information can be obtained by the CPU 1 or by a second CPU 61 by addressing those locations from $4000 0000 to $5FFF FFFF. Another embodiment of the present invention is shown in FIG. 10 where the motherboard I/O and ROM memory space with respect to NUBUS bus cards is located at $F000 0000 to $F0FF FFFF. In this embodiment, the memory space of motherboard I/O information and system ROM (on the motherboard) which is accessible by the NUBUS bus cards (in NUBUS bus slots) is limited to 16 MB (megabytes) while CPU 1 may still access region $4000 0000 to $5FFF FFFF; however, many possible systems can be constructed in which this limited space of 16 MB is sufficient for ROM and I/O use. Thus, for a NUBUS bus card, it may access the ROM which is part of memory 2 on the motherboard by presenting addresses in the range $F000 0000 to $F0FF FFFF on the NUBUS bus which causes an access to that ROM. This is implemented in well-known fashion by the interface 9 which decodes addresses from NUBUS bus in the $F000 0000 to $F0FF FFFF region into the ROM and I/O region of the motherboard ($4000 0000 to $5FFF FFFF). The CPU 1 need not be similarly constrained, and accordingly, it may seek motherboard ROM or I/O memory by addressing the region defined by $4000 0000 to $5FFF FFFF; that is, CPU 1a may have additional ROM or I/O memory (as part of memory 2) which is not available to the NUBUS bus cards (which are limited in access to essential system ROM and I/O on the motherboard). This embodiment of the invention, as shown in FIG. 10 is consistent with the NUBUS bus standards which require a configuration ROM be located at the top of the 16 MB small (slot) space; thus, slot $0's ROM space is located at the top of the space $F000 0000 to $F0FF FFFF.

Figure 12:
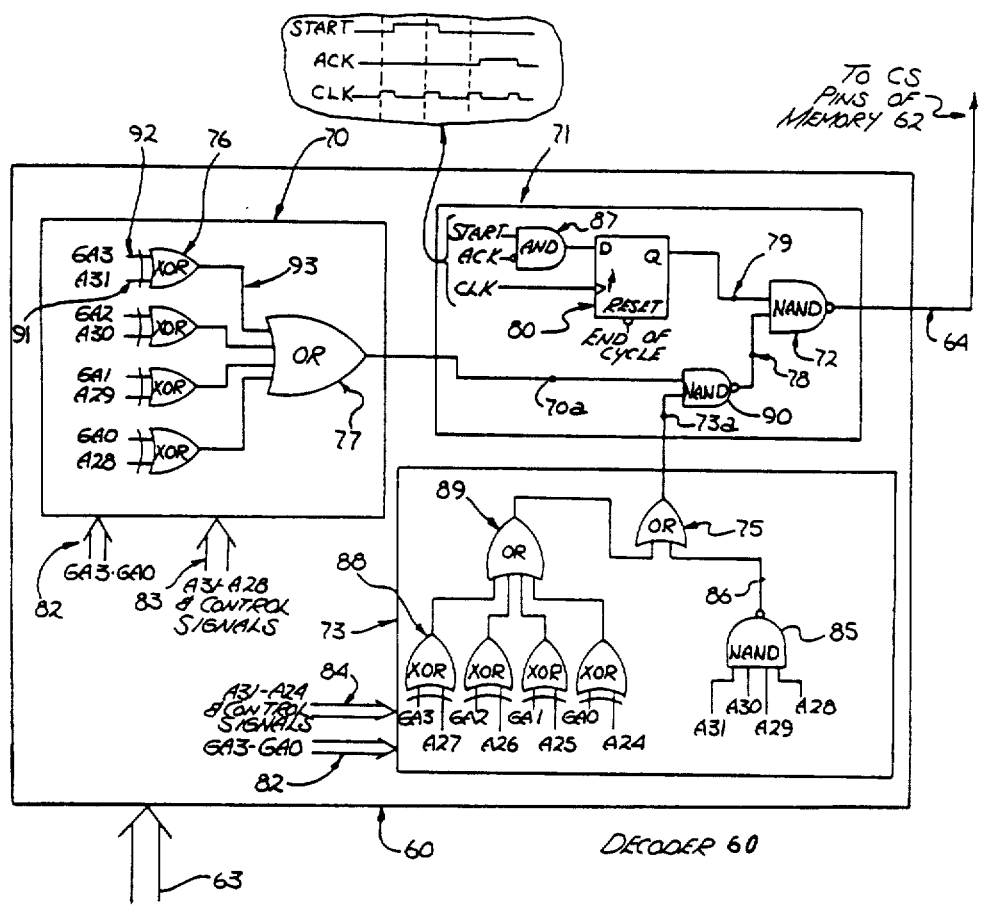
FIG. 12 is a schematic diagram of an exemplary decoder means utilized on a card according to the invention.

The card according to the present invention will be described with reference generally to FIGS. 4, 12 and 14. FIG. 4 shows a card of the present invention which may be incorporated into the computer system of the present invention by plugging it into one of the slots of the system, such as slot 29. The card includes a printed circuit board 50 on which is disposed conducting means forming various lines such as the card bus 65 and the interconnect buses 67, 68, and 69. Similarly, FIG. 14 shows a card 50a of the present invention which is substantially identical to the card shown in FIG. 4 except it does not include a CPU 61 which generally permits the card 50 to act as a master with respect to the NUBUS bus 10 while the card 50a shown in FIG. 14 can usually only be a slave and cannot take control of the NUBUS bus 10 and cannot initiate a NUBUS transaction. The cards 50 and 50a include terminals 51 which make electrical connections with cooperating terminals in the slots to thereby couple the various components on the cards to the various signals appearing on the main circuit board 14. All NUBUS bus signals (to and from NUBUS bus) are buffered and inverted by the buffers 59 on the cards. Thus, for example interconnect bus 63 connects the address lines A31 through A24 of the NUBUS bus 10 to the decoder means 60. The bus 63 also includes power and the distinct identification line means, which in this embodiment has four signal lines GA3, GA2, GA1, and GA0, that are coupled to terminals 52, 53, 54, and 55 respectively. That is, the signal GA3 is applied to terminal 52 through a cooperating terminal located in the slot which receives the card 50. Similarly, the signal GA2 is applied to terminal 53; signal GA1 is applied to terminal 54; and GA0 is applied to terminal 55. These terminals 52, 53, 54, and 55 are coupled to conductor means which present these four signals (as inverted) to the decoder means 60 at the input 82 of the decoder means 60, as shown in FIG. 12.

The signals present in the slots of this particular embodiment are presented below in Table 2 and are NUBUS bus signals. Of course, NUBUS bus 10 includes a 32-bit address bus which, during a first read cycle presents the address of the memory location sought to be accessed and during a second cycle acts as a data bus and receives data stored in that memory location. During a writing to memory, NUBUS bus 10 carries, on its 32-bit address bus during a first cycle, the address of the location to be written to and during a second cycle NUBUS bus 10 provides the data to be written into the location addressed in the first cycle. The NUBUS bus 10 is substantially an IEEE 1196 bus. The cards generally accept and use most of these signals although their use will depend on the particular needs of the card and the designer's goals.

TABLE 2

| Signal | NUBUS bus Slot Signals Description Description |
|---|---|
| +5V | Power to slot. 5 Volts. |
| +12V | Power to slot. 12 Volts. |
| −12V | Power to slot. −12 Volts. |
| −5.2V | Unused in this embodiment. All −5.2V signals are connected together on the slots. |
| GND | Power return for +5V, +12V, and −12V. |
| RESET | Open collector signal. Asserted at power up, by the CPU 1, or by a push button reset switch which may be included. Pulled up to +5V by a 1K ohm resistor. Slot card should use this signal to reset circuitry on card. |
| SPV | Slot Parity Valid. If a card is providing parity on /SP this signal is asserted. The slash ("/") indicates the signal is active low--that is, it activates its target when it goes low. |
| SP | Slot Parity. Odd parity of /AD0-/AD31 if /SPV asserted. |
| TM0-TM1 | Transaction modifiers. Used during START cycle to indicate the size of the transaction. Used during ACK cycle to indicate completion status. |
| A0-A31 | NUBUS bus Address/Data bits 0 through 31. Used during START cycle to indicate address. Used during ACK cycle to indicate data. NUBUS bus specifications refer to these sugnals as AD0-AD31 or AD (31...0) because the same 32 lines carry address during a first cycle and then carry data during a second cycle. |
| PFW | Power Fail Warning. An open collector signal pulled up by a 220 w resistor to +5V. When the signal is pulled up the power supply is activated. When this signal is pulled low the power supply is disabled. The power supply itself will pull this signal low as a power fail warning 2 ms before the AC power is lost. This is an option under IEEE 1196 standards. |
| ARB0-ARB3 | Arbitration bits 0 through 3. Open collector signals which are terminated in the slots in accordance with IEEE 1196 specifications (see, e.g., Table 6 of the specifications). Used to arbitrate bus mastership between the slots according to NUBUS bus Specifications. |
| GA0-GA3 | Geographical Address bits 0 through 3. Hard coded binary address of slot. Pins tied to GND or open (or +5V instead of open). |
| START | Asserted to indicate the presentation of an address on A0-A31. Also used to start arbitration for the bus mastership. |
| ACK | Acknowledge. Used to indicate acknowledgement of START cycle. |
| RQST | Request. Asserted to request bus mastership. |
| NMRQ | Non-master request. An open collector signal which are terminated in the slots in accordance with IEEE 1196 specifications (see, e.g., Table 6 of the specifications). Used by card to signal a interrupt to interrupt receiver. |
| CLK | NUBUS bus Clock. Asymmetrical 10 MHz clock which sychronizes transactions on NUBUS bus. |

The construction and use of the decoder means 60 is known by those with ordinary skill in the art. It essentially involves the use of a comparator means with an enabling means where the comparator compares the NUBUS bus address to the signal appearing on the distinct line identification means and determines when the address is within the reserved memory space for the memory 62 of the card. However, the use of the decoder means in this context to reserve 256-megabytes of memory space is novel and accordingly, a description of a simple decoder means including a comparator means and an enabling means will be described. It is within the ordinary skill of the art to develop other decoder means which perform the functions of the present invention.

In a typical transaction between the card 50a and the CPU 1, the memory 62 is selectively coupled to the CPU 1 through NUBUS bus 10 and its associated interface 9, described below, to receive addresses and to provide data (or receive data when written to) over NUBUS bus 10. The CPU 1 includes an address generation means for generating $2^{32}$ different addresses from location $0000 0000 to location $FFFF FFFF. Addresses from the CPU 1, which are 32-bits wide, exit the CPU 1 through the processor bus 5. The 32-bit address then enters the interconnect bus 25 and appears at the interface 9 which determines that the address is within the NUBUS bus address space, which begins at $6000 00000. Below that address, memory 2 and I/O circuitry 7 will be addressed by the CPU 1. At and above the address, memory in the slot's super spaces or small spaces will be addressed. Interface 9 determines that a NUBUS bus address is being selected and permits, after synchronizing the address signals of the CPU 1 to the NUBUS bus and determining ownership of the NUBUS bus 10 in favor of the CPU 1, the address to appear on NUBUS bus 10 through the interconnect bus 11. For purposes of illustration, we shall assume that a card 50a, shown in FIG. 14 is in slot $9 which has a distinct number in the system of $9. The decoder means 60 receives the address signals through NUBUS bus 10 and determines whether the addresses are for that card's memory space.

The decoder means 60 includes a comparator means 70 which compares the most significant hexadecimal digit of the address (for reading or writing) to the distinct number, in hexadecimal, of the slot into which the card having the decoder means 60 is plugged. The decoder means also includes a control and clock signal means 71 which includes NUBUS bus clock and START and ACK signals. The decoder means may also further include a driver, a well-known component in the prior art and hence not shown, which provides enough current to drive the output from the decoder means 60 to sufficient levels to affect the target of those outputs, which is the Chip Select (CS) lines and pins of the memory 62. The comparator means 73, which is also part of the decoder means 60, compares the address to determine whether the slot's small space is being addressed. When one of comparator means (either 70 or 73) determines that the address appearing on NUBUS bus 10 is within the super space or small space of the card, that particular comparator means along with the control means 71 activates the Chip Select (CS) lines connected to the memory 62. The Chip Select (sometimes referred to as the Chip Enable Signal) line is used, as is well known, to indicate to memory, such as memory 62, that it is being addressed (either for reading or writing). The Chip Select lines are coupled to line 64 as shown in FIGS. 4 and 14.

The comparator means 70 of the decoder means 60 includes four exclusive OR gates ("XOR"), such as the exclusive OR gate 76 which compares the GA3 signal (appearing at input 92) to the most significant binary bit of the 32-bit address line, A31, which is input at input 91 of the exclusive OR gate 76. It is understood, as noted before, that the NUBUS bus signals in the decoder means 60 are inverted (on the card in buffers 59); thus, GA3 . . . GA0, the address signals A31 . . . A24 and START, ACK and CLK as used in the decoder means 60 are inverted. For example, the START signal shown in FIG. 12 is the inverted NUBUS bus START signal. If the most significant binary bit of the address is equal to the signal GA3 then a logical 0 will appear at the output of the exclusive OR gate 76, which output is passed via line 93 to a four input OR gate 77. The address signals A31 through A28 and certain signals, such as power and ground, are applied to the comparator means 70 at the input 83. These signals are then provided to the various exclusive OR gates of the comparator means 70 as shown in FIG. 12. The output from each of the exclusive OR gates in comparator means 70 will be logical 0 only if the two inputs to a particular XOR gate are identical. Thus, each exclusive OR gate does a bit for bit comparison between one of the bit carrying lines which acts as a part of the distinct identification line means and one of the four most significant address lines. It can be seen that when a distinct number, in hexadecimal, is equal to the most significant hexadecimal digit of the address, each of the exclusive OR gates will produce a logical 0 at its output causing the output of the OR gate 77 to also be logical 0 causing node 70a to be logical 0. Node 70a is coupled to the output of OR gate 77 and is also coupled to one of the inputs to NAND gate 90 which is part of the control means 71. The output from the comparator means 73 is coupled to node 73a in the control means 71 and is also coupled to the other input of NAND gate 90. When an address is in the card's slot space, the output of the comparator means 73 will be logical 0 and node 78 (the output of NAND gate 90) will be logical 1. When an address is in the super space of the slot, the ouput of comparator means 70 will be logical 0 and node 78 (the output of NAND gate 90) will be logical 1. When the address is not in the slot's small space and not in the card's super small, node 78 will be logical 0 (since node 70a and node 73a will each be logical 1). When the address is valid (during a START), the signal at the output of AND gate 87 will be logical 1 and will be clocked (at the next NUBUS bus clock pulse) to the output Q of the flip-flop 80 so that a logical 1 appears at node 79. Thus, when an address is valid and is in the card's reserved space (small or super), nodes 78 and 79 will be logical 1 causing line 64 to be logical 0, thereby activating the memory 62 for addressing. At the end of the time when the address is valid, the output of AND gate 87 will be logical 0 and will be clocked to node 79 (through the JK flip-flop 80) and the memory 62 will be deactivated. When an address is valid, START (as shown in FIG. 12) is logical one and ACK is logical 0 (see insert to FIG. 12 showing a timing diagram of the signals START, ACK and CLK which are inputted to the means 71). The ACK signal is inverted at the input to AND gate 87. Thus, when an address is valid, the output of AND gate 87 is logical 1; when an address is invalid, START is logical 0 causing the output of AND gate 87 to be logical 0, which value is clocked to the output Q of flip-flop 80 at the next NUBUS bus clock pulse as shown in FIG. 12. A logical 0 at output Q will deactivate the CS lines of memory 62. The flip-flop 80 is a clocked JK flip-flop with the K input tied to the J ("D") input through an inverter; such a flip-flop is sometimes referred to as a D-type flip-flop where K is the complement of J. An End of Cycle signal may op-
tionally be applied to the Reset input of the flip-flop 80. The signal is obtained from the control circuitry on the card (e.g. CPU 61) and it indicates the end of a transaction. The End of Cycle signal is active low and therefore it is inverted at the input to Reset.

The particular output on line 64 from the control means 71 will depend on whether the memory 62 specifies (according to the manufacturer) that CS is active low (i.e. at a low voltage like ground) of high (+5 volts). In this example, the memory 62 is assumed to have CS active low ("/CS") and therefore the memory 62 is selected for addressing when the output of means 71 is logical 0. Thus, the activation of line 64 occurs when the output of NAND gate 72 is logical 0 (low), causing CS to be pulled to substantially ground and thereby indicating to the memory chips (memory 62) that they are being addressed.

If there is no match between the distinct number and the most significant hexadecimal digit of the address, at least one logical 1 will appear on one of the four outputs of the exclusive OR gates in the comparator means 70 which causes a 1 to appear at the output of the OR gate 77, which logical value 1 appears at node 70a. This means the address is not in the card's super space. In this case, the memory 62 can only be addressed from NUBUS bus 10 only if the address is in region 42 (small spaces).

The decoder means 60 also includes a comparator means 73 which is responsible for reserving for the particular card a "slot space" which is in the upper 1/16th physical address space of the system (i.e. region 42 shown in FIG. 3). More specifically, a comparator means 73 allocates 16-megabytes of memory for the card based on the distinct number of the slot into which the card is plugged. The comparator means 73 includes a NAND gate 85 which determines when addresses presented to the card are in the region 42. The exclusive OR ("XOR") gates of the comparator means 73, such as exclusive OR gate 88, and the OR gate 89 compare the second most significant hexadecimal digit to the distinct number of the slot into which the card is plugged to determine when the distinct number is equal to the second most significant hexadecimal digit of the address appearing on the 32-bit address bus of NUBUS bus 10. When this equality condition occurs each of the XOR gates of means 73, such as gate 88, will produce a logical 0 at its output causing the output of the OR gate 89 to be logical 0. The output of OR gate 89 is one of the inputs to OR gate 75. The four most significant binary bits of the address (A31 . . . A28) are applied to the inputs of NAND gate 85; the output of this gate is logical 0 only when the address is in the small space region 42. The output of NAND gate 85 is one of the inputs of OR gate 75. The inputs to OR gate 75 are both logical 0 only when the address is in the card's small space in region 42. Thus, the ouput of OR gate 75 is only logical 0 when the address is in the card's small space. The address lines (A27, A26, A25, and A24) constitute the second most significant hexadecimal digit of the address appearing on the 32-bit address bus of NUBUS bus 10.

It can be seen that when a card, such as card 50a, is plugged into a slot having a distinct number $X, a decoder means 60 will cause that card to have memory space reserved for it from locations $X000 0000 to $XFFF FFFF and additional memory space from $FX00 0000 to location $FXFF FFFF.

Transactions between the CPU 1 and NUBUS bus 10 typically require certain actions of the interface 9 which is referred to as the NUBUS bus interface 9. The exact implementation of the interface will depend on the microprocessor selected for CPU 1 and on its associated buses. In its simplest form, the interface could be another decoder means, having six decoders, each such as decoder means 60; that decoder means receives six different distinct signals having the distinct numbers S0, S1, S2, S3, S4 and S5, each of those signals for one of the six decoders; this arrangement would produce the resulting division of physical address memory space as shown in FIG. 3 for the computer system shown in FIG. 1. The interface 9 would also be required to synchronize any differences in timing between the CPU 1 and the NUBUS bus Clocks and would determine ownership of the buses being requested (whether the NUBUS bus 10 or the processor buses 5, 25 and 6) by the master device, so that only 1 address appears on all buses 10, 5 and 25 at one time. Thus, there would be several decoder means as shown in FIG. 12 each of which receives a different distinct signal. The output of these decoder means would be coupled to the CS pins of memory 2. At the same time, the CPU 1 could access the slots attached to NUBUS bus 10 by merely placing signals on the address bus 5 which is coupled to the interface 9 which permits the address signal from the CPU 1 to appear on NUBUS bus 10. Similarly, the CPU 1 could provide data to NUBUS bus slots by placing the data on the data bus 6 which causes the data signals to appear at the NUBUS bus interface 9 via the interconnect bus 12 and those data signals would then be conveyed to NUBUS bus 10 and then received by the appropriate slot depending on the immediately preceding address signal which appeared on NUBUS bus 10. In effect, the CPU 1 and its associated circuitry including the memory 2 would appear to NUBUS bus 10 as if it was on a card in slot 0 or slots 1, 2, and 3. In the following discussion of a NUBUS bus interface, the term processor bus is generally used to refer to the data bus 6 which is coupled to the CPU 1 and to the memory 2 and to the address buses 5 and 25 as shown in FIG. 1.

The NUBUS bus interface 9, as shown in FIG. 5, includes three state machines and the NUBUS bus clocks which interface between the six slots (29, 30, 31, 32, 33, and 34) and the NUBUS bus 10 and CPU 1 and memory 2 and their associated circuitry on the mother board 14. In general, the interface 9 must determine ownership of the requested bus(es) between masters, such as CPU 1 and a CPU on a card (E.G. cput 61), to prevent 2 different addresses from 2 different masters from appearing on a bus, such as a bus 5 or NUBUS bus 10, simultaneously; that is, the interface 9 must determine bus ownership, via arbitration between possible masters requesting the same bus, to prevent address collisions on a bus. Similarly, during data cycles the interface 9 must determine bus ownership, via arbitration between possible masters requesting the same bus, to prevent data collisions on a bus (such as bus 6 or NUBUS bus 10). Moreover, the interface 9 must synchronize the signals of the requesting master to the timing of the requested bus which will be driven (for addresses or writing data) or listened to (for reading data) by the master. The interface may be implemented by well-known techniques in a programmable logic array.

The signals present on NUBUS bus are described in the 1196 specification of the IEEE and in the Texas Instruments' publications referred to above. Generally, the NUBUS bus standards specify logical, physical and electrical standards for the four types of signals present in the NUBUS bus 10. These signals include utility signals such as the clock and the distinct identification line means; the address/data signals along with various control signals; the arbitration signals; and the power signals. It can be seen that certain of these NUBUS bus signals appear on the left side of the NUBUS bus interface 9 shown in FIG. 5. Signals provided by the CPU 1 or the memory 2 flow through the interface or permit the interface to allow the CPU 1 to communicate with NUBUS 10 and vice versa. The following table describes the signals used in the NUBUS bus state machine involved in the NUBUS bus interface 9. The particular implementation of the interface 9 will depend on the particular CPU 1 selected for use on the mother board and on the designer's goals.

TABLE 3

Signals used in NUBUS bus State Machines In NUBUS bus Interface 9

| Signal | Description |
|---|---|
| RQST | A NUBUS bus signal; active low; indicates a request for bus mastership. |
| NUBUS | Decoded address from processor CPU 1 indicating an address reference to NUBUS bus; active low. The address from CPU 1 is decoded in a decoder means, which can be readily constructed by one of ordinary skill in the art, and which determines when the address on bus 25 in the NUBUS bus address range of S6000 0000 to SFFFF FFFF. |
| START | NUBUS bus signal; active low; indicates an address is present on NUBUS bus. |
| ARB0-ARB3 | NUBUS bus signals; active low; arbitration address of bus masters competing for NUBUS bus mastership. |
| ACK | NUBUS bus "acknowledge"signal; active low; slave NUBUS bus device is acknowledging START transaction. |
| RMC | Processor CPU 1 signal indicating a read/modify/ write is occurring on the processor CPU 1 bus 6 and 25. |
| AS | Processor CPU 1 address strobe indicating the address lines from the CPU 1 are valid and a cycle is requested. Active low ("/AS"). |
| /BUSLOCK | The processor buses 6, 5 and 25 can not be interrupted by NUBUS bus transactions into memory 2. |
| DSACKx | The Data Strobe Acknowledge from the memory 2. |
| BG | Processor CPU 1 bus grant indicating the processor buses 5, 6 and 25 have been granted to the NUBUS bus to communicate with the memory 2 using the NUBUS bus to Memory 2 state machine 104. |
| C16M | The processor CPU 1 clock which is used to qualify signals from the processor CPU 1 as valid. |
| R/W | Read/Write signal which is used to indicate when a read or a write is occurring. |
| /BR | A bus request from NUBUS bus requesting mastership of the processor buses, principally bus 6 (via bus 12) and buses 5 and 25. |
| /BGACK | NUBUS bus signal from NUBUS bus state machine 104 acknowledging granting of the processor buses by the processor. Typically, NUBUS bus requests control of the processor buses by issuing a /BR signal; request for the processor buses is granted by the signal /BG which is received by the NUBUS bus to memory 2 state machine 104 which acknowledges receiving the granting of the processor buses for mastership. |
| /BERR | Bus error signal from NUBUS bus indicating there is an error in the system. This signal is usually issued by the NUBUS bus timeout state machine 105 which watches for transactions which exceed approximately 25 microseconds; any such transaction is assumed by the bus timeout state machine to be in error resulting in the |

TABLE 3-continued

| Signal | Signals used in NUBUS bus State Machines In NUBUS bus Interface 9 Description |
|---|---|
| /DS | signal /BERR to be sent to the processor. Datastrobe: A NUBUS bus signal indicating the data lines from the NUBUS bus are valid and a cycle is requested. |

The processor CPU 1 typically accesses and requests the NUBUS bus 10 whenever the processor CPU 1 generates a physical address from $6000 0000 to $FFFF FFFF. The CPU 1 to NUBUS bus state machine 103 determines there is such a request when decoders on the mother board coupled to bus 25 indicate an address on bus 25 has a most significant hexadecimal digit between $6 and $F, including $6 and $F. Under these circumstances, the output of those decoders causes the assertion of the /NUBUS signal. The state machine 103 then synchronizes the request for NUBUS bus control with the NUBUS bus clock and presents the same address over the bus 10 after determining the CPU 1 may take ownership of NUBUS bus 10 to drive the address signals onto the NUBUS bus 10. If a card on NUBUS bus responds, the data is transferred. If no card responds, a NUBUS bus timeout occurs and a bus error (/BERR) is sent to the processor, which usually causes execution of an error handling routine. The NUBUS timeout state machine 105 monitors the time between START signals on NUBUS bus and acknowledge (ACK) signals on NUBUS bus. When the time between those signals exceeds 255 NUBUS bus clocks, according to the NUBUS bus standards, the NUBUS bus timeout state machine generates the bus error as indicated above. FIG. 8 illustrates the signals involved in the processor CPU 1 to NUBUS bus transaction through the NUBUS bus interface 9 and more specifically through the processor to NUBUS bus state machine 103. The signals on the right side of the block 103 shown in FIG. 8 which are directed to the CPU 1 side of machine 103 are NUBUS bus signals. The right side of machine 103 is the NUBUS bus side of the system and includes the 6 slots. On the left side of the interface 9 is the CPU 1 and memory 2 portion of the system. This is also true for FIG. 9. Signals entering (i.e. the arrow is directed towards the machine 103) the machine 103 from the NUBUS bus side are generally NUBUS bus signals and signals exiting the machine 103 on the NUBUS bus side are generated by the CPU 1 or the result of the interaction CPU 1 and the machine 103. Similarly, signals on the CPU 1 side of the machine 103 which enter the machine 103 are signals generally from the CPU 1 or memory 2 or circuitry associated with that portion of the system. The signals on the CPU 1 side of machines 103 and 104 are carried by the bus 12 of FIG. 1 and the signals on the NUBUS bus side of machines 103 and 104 are carried by bus 11.

The normal CPU 1 to NUBUS bus transaction starts with the state mahcine 103 waiting for the signal /NuBus to be asserted (which is synchronized to the 10-MHz NUBUS bus clock). When this signal is asserted, and no other bus masters are asserting RQST on NUBUS bus 10, state B is entered into from state A, the prior waiting state. State B has asserted the RQST signal of NuBus and establishes a request by CPU 1 for the NUBUS bus 10 among any other bus masters which are asserting RQST at the same time. For purposes of arbitration under the NUBUS bus standards, the CPU 1 is assigned to slot $0.

State B is followed by state C during which the arbitration and acknowledge (ACK) signals are sampled to check if any other NUBUS bus transaction is in progress or if some other NUBUS bus master has won NUBUS bus 10. If a transaction is in progress and no other bus master won mastership, state C is retained. If any other bus master requested the bus during state B, state D is entered into. [Note: Since the processor CPU 1 accesses the bus from slot $0, it always loses to the other slots since the arbitration is based on the distinct number under the NUBUS bus standard]. If no other master has won the bus and no other transaction is occuring, state E is entered into.

State E asserts the START signal of the NUBUS bus 10 and drives the address from CPU 1 onto the NUBUS bus 10. It is understood that latches and buffers are used to temporarily store addresses and data in these state machines 103 and 104 and generally in the system. State F follows State E and waits for the acknowledge signal (ACK) from the card which was addressed. When the acknowledge signal is asserted on NUBUS bus 10, and no other masters are requesting the bus 10, a State G is entered in which the DSACKx signals to the processor CPU 1 are generated to finish the process cycle. If no other master is asserting RQST during State G, State H is entered into which is a State in which the NUBUS bus 10 is "parked" which is to say that a second NUBUS bus transaction from the processor CPU 1 will be able to go directly to state E to start the NUBUS bus access instead of state A. If RQST is asserted during States F, G, or H, the NUBUS bus 10 must be rearbitrated to determine the current bus master and State A becomes the waiting State rather than State H. These sequences of states may be executed by well known state machine techniques. The following table summarizes the states and signals involved in the processor CPU 1 to NUBUS bus interface which is executed by the CPU 1 to NUBUS bus state machine 103.

TABLE 4

| | Processor CPU 1 to NUBUS bus States | |
|---|---|---|
| States | Signals Asserted | Description |
| A | | Idle state. Waiting for the processor CPU 1 to generate NUBUS bus address access (addressing a memory location from $6000 0000 to $FFFF FFFF) and for RQST (from cards) to be deasserted by cards in the NUBUS bus slots. |
| B | RQST | Request NUBUS bus. The processor CPU 1 is requesting NUBUS bus bus and no other RQST asserted. |
| C | RQST | Test for arbitration win. The arbitration lines should all be deasserted since processor CPU 1 is arbitration number zero. If last cycle is waiting for ACK, stay put. If an arbitration line is asserted, try again after next START transaction. |
| D | RQST | Wait for next round of arbitration. START indicates next round of arbitration is available. |
| E | START A0-A31 | Start transaction. |

TABLE 4-continued

Processor CPU 1 to NUBUS bus States

| States | Signals Asserted | Description |
|---|---|---|
|  | (NUBUS) bus | Assert processor CPU 1 address on 32-bit address line of NUBUS bus 10. |
| F | A0-A31 | Wait for ACK. Wait for acknowledge from slave device. CPU 1 Asserts A0-A31 (NUBUS) bus if CPU 1 is writing to NUBUS bus device (e.g. a card). Note whether RQST is asserted to determine if bus will remain "parked". If RQST is asserted, the state machine will recycle to state A after state G. |
| G | DSACK0, DSACK1 | Assert DSACKx. NUBUS bus slave completed transaction, and processor CPU 1 cycle. NUBUS remains "parked". |
| H |  | Wait for next processor CPU 1 to NUBUS bus transaction. NUBUS bus remains "parked" to allow quick start to next cycle. |

The state machine shown in FIG. 8 receives the address signals of the CPU 1 (A0-A31) from the CPU 1 on the bus 25. The signals appearing on the right side of the state machine 103 are NUBUS bus signals. Certain signals on the left side of state machine 103 are also NUBUS bus signals such as the clock signals /CN10M and C20M, as well as /NuBus although the latter is caused by CPU 1 by generating a NUBUS bus address.

The NUBUS bus to CPU 1 buses state machine 104, as shown in FIG. 9, is for accesses for the memory 2 (which may include RAM, ROM and I/O) from NUBUS bus. In one embodiment, if an address from $0000 0000 to $5FFF FFFF is presented on the NUBUS bus, then the NUBUS bus to processor buses state machine 104 requests the processor buses from the CPU 14 and performs an access to the address. An alternative embodiment (FIG. 10) will also be described in which accesses to RAM of memory 2 occur by addressing $0000 0000 to $3FFF FFFF and accesses to ROM or I/O of the motherboard occur by addressing $F000 0000 to $F0FF FFFF. Normally, after the data is sent to or from the NUBUS bus master (i.e. the card in the NUBUS bus slot), control of the processor buses 5 and 6 is returned to the processor CPU 1.

The following Table describes the states and signals involved in the NUBUS bus to CPU 1 buses transaction.

TABLE 5

| State | Signals Asserted | Description |
|---|---|---|
| A1 |  | Idle state. Waiting for address on NUBUS bus 10 to processor buses locations (e.g. $0000 0000 to $3FFF FFFF and $F000 0000 to $F0FF FFFF). If the processor buses are not locked (e.g. by locking the processor buses through assertion of Buslock signal of CPU 1) and the CPU 1 is not doing a NUBUS bus access, the processor buses will be requested. If Buslock is asserted, then NUBUS access to Memory 2 is delayed until Buslock is reasserted and the state remains at A1. |
| B1 | BR | Bus Request asserted. Request by NUBUS bus of processor buses for NUBUS bus to Memory 2 transaction. Wait for CPU 1 to assert Bus Grant and deassert address strobe. |
| C1 | BGACK, A0-A31 (on bus 25) D0-D31 (on bus 6) R/W | Assert mastership of processor buses and set up addresses and/or data. |
| D1 | AS; DS; A0-A31 (on bus 25) | Address strobe asserted. Data strobe asserted. |
| E1 | D0-D31 DSACK | Wait for valid data from Memory 2 (or write to Memory 2 during time when data is valid). Wait for Data Strobe Acknowledge (DSACK) from Memory 2 to indicate end of cycle. |
| F1 | ACK (NuBus) | NUBUS bus to processor buses transaction complete. Wait to determine if next cycle will continue with NUBUS bus controlling the processor buses. NUBUS can lock onto the processor buses by asserting a Lock Attention signal which causes CPU 1 to relinquish control of the processor buses for several transactions without CPU 1 contention until Null Attention signal is asserted; assertion of Lock Attention causes looping of the states B1 to F1. |

The NUBUS bus to CPU 1 buses transaction begins with state A1 shown in Table 5 above, where the state machine 104 is idling by waiting for an address on NUBUS bus 10 in the Memory 2 memory space (e.g. $0000 0000 to $5FFF FFFF; or, in the alternative embodiment of FIG. 10, $0000 0000 to $3FFF FFFF and $F000 0000 to $F0FF FFFF). NUBUS bus accesses to the processor buses can be prevented by asserting the Buslock signal which causes all NUBUS bus transactions to this address space to be acknowledged with a "try again later" response. If the address is within the Memory 2 space and Buslock is not asserted, then state B1 is entered.

At state B1, the CPU 1 releases the processor buses by issuing a BusGrant which responds to a Bus Request; the Bus Grant is acknowledged by the NUBUS bus device by a BusGrant Acknowledgement in the next state, C1. The addresses are driven onto the processor address buses and the data is transferred in states D1 and E1. The transaction is completed in F1 when the NUBUS bus ACK signal is asserted on NUBUS bus 10.

In the alternative embodiment of FIG. 10, the NUBUS bus devices access the RAM of memory 2 by presenting addresses in the range $0000 0000 to $3FFF FFFF. NUBUS bus devices, in this embodiment, access a portion of the motherboard's ROM memory space and a portion of the motherboard's I/O memory space (which is usually physical RAM set aside for I/O use) indirectly by presenting addresses on NUBUS bus 10 IN THE RANGE OF $F000 0000 to $F0FF FFFF (slot space $0). In this embodiment, addresses on NUBUS bus 10 in the range $4000 0000 to $5FFF FFFF do not access ROM or I/O, but addresses on the CPU 1 buses (e.g. bus 5) in that range do access the complete motherboard ROM and I/O memory space.

In keeping with NUBUS bus standards, the portion of ROM of the motherboard (which is assigned to at least slot $0) which is accessible to NUBUS bus is placed at the top of the slot space $0. The particular allocation of the memory in slot space $0 between motherboard ROM and motherboard I/O depends on the designers needs. In one preferred embodiment, the slot space $0 is divided in half such that an address to $F080 0000 to $F0FF FFFF on NUBUS bus 10 produces an access to an 8 megabyte region of the ROM of the motherboard (i.e. ROM of the memory 2), and an address to $F000 0000 to $F07F FFFF on NUBUS bus 10 produces an access to an 8 MB (megabyte) region of the I/O memory space. The particular 8 MB portions of ROM and I/O memory space will depend on what regions of memory NUBUS devices will need or want to use. Often, the entire system (motherboard) ROM and motherboard I/O will fit into the 16 MB region of slot space $0. Well known decoders may be used to cause the decoding from the NUBUS bus address in slot space $0 to the appropriate ROM and I/O location.

What is claimed:

1. A printed circuit board card having terminals electrically connecting with cooperating terminals on a slot for receiving said card, said slot being located on a main circuit board of a computer system, said main circuit board including a central processing unit (CPU), memory coupled to said CPU to receive addresses of memory locations from said CPU and to provide data to said CPU, 32-bit address bus being coupled to said CPU and to said memory to address said memory, and input/output circuitry coupled to said memory to provide data to said memory and coupled to said CPU to receive control signals from said CPU, said slot being coupled to said 32-bit address bus, said CPU including an address generation means for generating $2^{32}$ different addresses ranging from location $0000 0000 to location $FFFF FFFF, said locations being in hexadecimal notation, said slot having a distinct number in said computer system and being coupled to distinct identification line means on said main circuit board, said distinct identification line means providing a distinct signal to said slot, said distinct signal identifying the distinct number of said slot, said card comprising a decoding means coupled to said distinct identification line means for receiving said distinct signal, said decoding means comparing said distinct number to an address appearing on said 32-bit address bus, said decoding means causing 256 megabytes of memory space to be reserved for said slot such that, where said distinct number of said slot is X, said 256 megabytes of memory space begins at location $X000 0000 and ends at location $XFFF FFFF, said locations being in hexadecimal notation and wherein said card in slot X includes a second memory disposed on said card, said second memory being coupled to said CPU through said 32-bit address bus to receive addresses of memory locations from said CPU and to provide data to said CPU, said second memory being coupled to said 32-bit address bus which provides, during a first cycle, an address and receives during a second cycle, data located at said address, wherein said second memory has memory locations reserved beginning at location $X000 0000 and ending at location $XFFF FFFF, and wherein X may be any number between 1 and 14.

* * * * *

UNITED STATES PATENT AND TRADEMARK OFFICE
CERTIFICATE OF CORRECTION

PATENT NO. : 5,056,060

DATED : 10/8/91

INVENTOR(S) : Fitch et al.

It is certified that error appears in the above-identified patent and that said Letters Patent is hereby corrected as shown below:

| | | |
|---|---|---|
| col. 02, line 45 | after "the" | insert --16-- |
| col. 02, line 61 | delete "is" | insert --if-- |
| col. 03, line 02 | after "(16-megabytes" | insert --)-- |
| col. 03, line 47 | after "NUBUS" | insert --bus-- |
| col. 03, line 51 | delete "decorder" | insert --decoder-- |
| col. 04, line 16 | after "bus" | insert --cards-- |
| col. 05, line 47 | delete "exhange" | insert --exchange-- |
| col. 06, line 22 | after "and" | insert --6-- |
| col. 06, line 45 | delete "of" | insert --or-- |
| col. 07, line 17 | delete "money" | insert --memory-- |
| col. 09, line 10 | delete "the" | insert --that-- |
| col. 10, line 47 | after "in" | insert --the-- |
| col. 16, line 56 | delete "ouput" | insert --output-- |
| col. 17, line 48 | delete "cput" | insert --CPU-- |
| col. 18, line 11 | after "NUBUS" | insert --bus-- |
| col. 19, line 29 | after "NUBUS" | insert --bus-- |
| col. 19, line 60 | delete "mahcine" | insert --machine-- |
| col. 19, line 66 | delete "NuBus" | insert --NUBUS bus-- |

UNITED STATES PATENT AND TRADEMARK OFFICE
CERTIFICATE OF CORRECTION

PATENT NO. : 5,056,060
DATED : 10/8/91
INVENTOR(S) : Fitch et al.

It is certified that error appears in the above-identified patent and that said Letters Patent is hereby corrected as shown below:

| | | |
|---|---|---|
| col. 21, line 20 | after "NUBUS" | insert --bus-- |
| col. 21, line 43 | delete "14" | insert --1-- |
| col. 21, line 67 | after "NUBUS" | insert --bus-- |
| col. 22, line 21 | delete "(NuBus)" | insert --(NUBUS bus)-- |
| col. 22, line 24 | after "NUBUS" | insert --bus-- |
| col. 23, line 16 | after "NUBUS" | insert --bus-- |

Signed and Sealed this

Twentieth Day of July, 1993

*Attest:*

MICHAEL K. KIRK

*Attesting Officer*    *Acting Commissioner of Patents and Trademarks*